Oct. 22, 1963 W. J. PARKS 3,107,890
RUBBER MOUNTING UNIT
Filed Feb. 24, 1958

INVENTOR.
WALTER J. PARKS
BY Jay & Jay
ATTORNEYS

United States Patent Office 3,107,890
Patented Oct. 22, 1963

3,107,890
RUBBER MOUNTING UNIT
Walter J. Parks, Cleveland, Ohio, assignor to The W. S. Tyler Company, Cleveland, Ohio, a corporation of Ohio
Filed Feb. 24, 1958, Ser. No. 717,077
1 Claim. (Cl. 248—358)

This invention, relating as indicated to a rubber mounting unit, is particularly directed to a rubber mounting unit incorporating two tubular support elements mounted in a block of rubber or elastomer, with each of the tubular supports being spaced parallel to each other and with the lower end of one of the supports being raised with respect to the other.

This invention is particularly directed to a rubber support unit in which tubular supports, either hollow or solid and not necessarily of cylindrical cross section, are mounted in a block of rubber having a layer of rubber outwardly of each of the tubular supports in a zone of rubber which is of lower stress concentration. The rubber mounting unit is particularly adapted for loading a static load on the raised tubular support along the axis to keep the rubber in shear and in compression.

The principal characteristic of these rubber support elements is that a given applied load is transferred from one tubular element to another by means of a block of rubber, which thereby is stressed in shear but also in which the stress distribution over a given cross-sectional area is advantageously controlled by the shape of the tubular elements, and also by the fact that a portion of the rubber block acts as a yielding abutment at the points adjacent to the tubular elements to reduce the stresses in the main block of rubber on the outside faces. These rubber mounting units are designed to give a larger deflection under a given load than designs heretofore available, i.e., the spring rate or pounds per inch deflection would be lower than that obtainable by conventional designs and increase the stability of the rubber compounds under heavy and continuous loading at fairly high frequencies, for example, 1000 cycles per minute and up in operation.

This invention is further characterized by a rubber support unit having tubular supports which reduce the length of a substantial portion of the rubber support element between the metallic or tubular supports and lengthen other portions of the rubber support element so that increased flexibility is obtained without impairing the stability of the rubber element. That is to say, there is a reduced length of the rubber element between the curved portions of a tubular support element but increased length between the sides on a line where a tangent may be drawn between two tubular support means.

In general in connection with these units, a cross-sectional area is determined by the maximum load to be carried and the maximum allowable stress of the rubber selected. The modulus of the rubber can be varied within certain limits to help meet the desired flexibility, but, in general, for vibrational deflections of fairly large amplitude, i.e., ⅜" to ½", the most effective way of decreasing the stiffness of the units is to increase the length of the unit from supporting point to supporting point. However, there is a practical limit to the length that may be used and still retain stability in the mounting under loaded conditions. In general, it is held that this length shall not exceed the smallest dimension (length or width) of the cross-sectional area. The application of this rule does not apply to this unit and though the minimum points on the curved contour of the tubular elements may come within the rule, the average point, which is the controlling point for purposes of calculation, is upwards of 40 percent greater than this longitudinal separation.

The stability is imparted by the shorter and more highly stressed areas in the center of the rubber, and these are buttressed from failure by the adjacent and lower stressed rubber. Also, there is a shifting of rubber around the tubular element providing a yieldable abutment.

It will be seen that each filament of fiber between the tubular supports will be longer as it proceeds around the curved surface, and as the length of filament increases it will be subjected to lower fiber stress.

It is known that in a rubber support element that the spring rate is a function of the cross-sectional area between the components and the modulus of the rubber and an inverse function of the length or thickness of the components. It will be seen that it is necessary to arrange the size of the cross-sectional area of the rubber and the length of the rubber components to obtain the desired spring rate. In previous designs where low spring rates demanded a small cross section, compared to the length of the resilient components, an unstable condition would exist in resilient units.

An object of this invention is to provide a new and improved rubber support mounting incorporating two tubular elements and a block of rubber or elastomeric material, one of the tubular elements being raised with respect to the other and each of the tubular elements having the rubber firmly bonded to the tubular element, and incorporating a zone or layer of rubber outwardly of each of the tubular elements and outwardly of the rubber joining the tubular elements.

A further object of this invention is to provide a new and improved rubber support mounting unit comprising two tubular elements and having a block of rubber therebetween and surrounding the tubular elements and bonded to the tubular elements, one of the elements being raised with respect to the other to provide a rubber support unit to support a static load on the axis of the tubular element and a dynamic load in a plane perpendicular thereto.

A further object of this invention is to provide a new and improved elastomeric support element having two tubular elements and a block of rubber with a layer of rubber outwardly thereof surrounding the tubular element, one of the elements being raised with respect to the other and the support element providing a resilient mounting having a mass of elastomer between the curved tubular support surfaces and a layer of rubber outwardly disposed therefrom which, when load is applied, has a lower stress concentration to support and retain the more highly stressed elastomer between the two tubular supports, said elastomer surrounding the outer tubular supports and providing a yieldable abutment for a load.

To the accomplishment of the foregoing and related ends, said invention then consists of the means hereinafter fully described and particularly pointed out in the claim; the following description setting forth in detail one approved means of carrying out the invention, such disclosed means, however, constituting but one of the various ways in which the principles of the invention may be used.

It will be seen in connection with this invention that reference is made to rubber and elastomer, i.e., elastomeric materials. By elastomer and elastomeric material is meant natural rubber and a variety of synthetic rubbers, consistent with proper modulus for this invention and its operating characteristics. These materials include neoprene and butyl rubber, but not necessarily limited thereto. When I refer to rubber in connection with this invention, I also mean to include the elastomeric materials. When I refer to tubular supports I mean both hollow and solid tubular supports of varying exterior surfaces, preferably curved surfaces, for example, a cylindrical support element.

Figure 1:
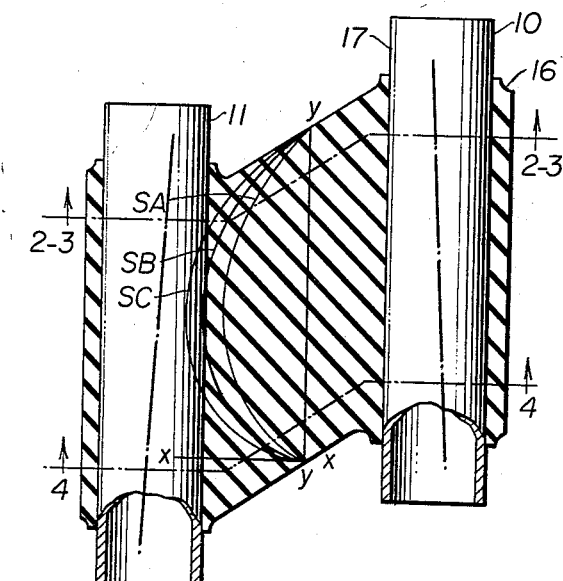
FIG. 1 is a longitudinal cross-sectional view of my new and improved tubular rubber support mount.

In the drawings, FIG. 1 is a longitudinal cross-sectional view through the tubular supports and elastomer. At 10 there is shown the raised tubular support and at 11 there is shown the lower tubular support, one of which, i.e., the raised one, is above the lower one by at least the amount of the maximum intended deflection. An elastomer block of rubber surrounds each of the tubular elements as seen in cross section in connection with FIG. 2, said block of rubber is shown generally at 12, and it has a zone of rubber 13 surrounding the tubular element 11 and another zone of rubber 14 surrounding the tubular element 10. A feathered edge shown in one instance at 16 tapers the rubber onto the end of the tubular support and an exposed end at 17 generally may be of any height as desired.

Figure 3:
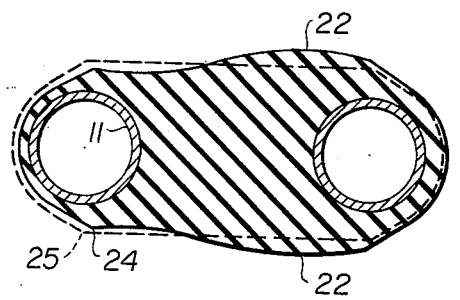
FIG. 3 is a further cross-sectional view under loaded conditions along the line 3—3 of FIG. 1.
Figure 4:
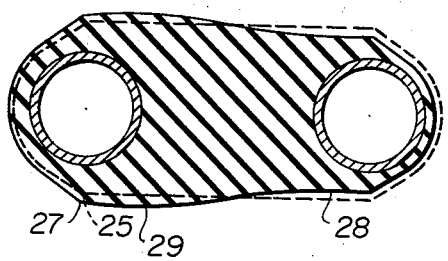
FIG. 4 is a further cross-sectional view under load conditions along the line 4—4 of FIG. 1.
Figure 5:
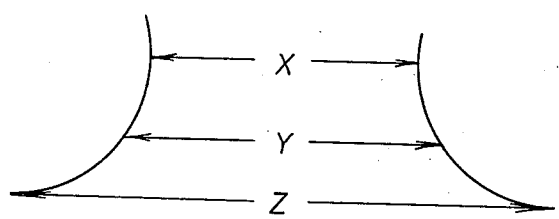
FIG. 5 is a diagrammatic presentation of the length of the fiber elements between the curved tubular support surfaces and between the minimum and maximum points.

The rubber support unit is shown under loaded conditions in connection with FIGS. 3 and 4, and FIG. 5 shows the relationship of the length of the fibers to one another at the minimum cross section as is seen in connection with FIG. 5 at X, X being the minimum length between the curved tubular supports, Y being another position which will be seen to be longer, whereas Z is the maximum filament length between a tangent to each of the tubular supports.

Figure 2:
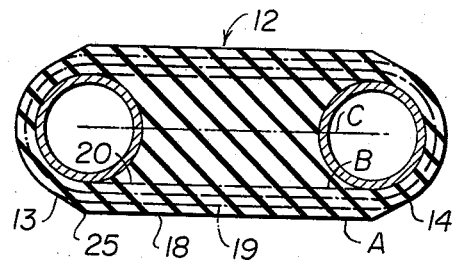
FIG. 2 is a cross-sectional transverse view along the line 2—2 of FIG. 1.

There will clearly be seen in connection with FIG. 2 that there is an outer surface of the rubber 18 and the band or layer of rubber, which is the continuation of the layers 13 and 14 on the tubular elements, continues along the side as is seen at 19. This layer of rubber may be between the tangent line as at 20 to the outer surface 18. The layer would be similarly positioned on the other side of the unit. When this is in a loaded condition, the rubber in the upper portion of the unit as seen in cross section along the line 3—3 of FIG. 1 will bulge outwardly under the shear loading as at 22 on either side. However, the rubber as seen opposite the tubular element 11 will pull in as at 24 from the original position indicated at 25.

In connection with FIG. 4, which is a similarly loaded condition, the line marking the zone between the section opposite the tangent and the curved rubber layer on the outside 13 is indicated by a point, seen in cross section in FIG. 2 at 25, and this is seen as moving outwardly and around in the form of a yieldable abutment at 27 in FIG. 4.

On the other portion of the unit, the rubber pulls in as at 28, whereas it moves outwardly adjacent to the line at 27 as seen at 29.

Preferably the unit should be loaded with the elastomer in shear and in compression. The rubber is much stronger in compression than in tension, and this type of rubber is therefore preferred. This unit is particularly adapted for a static load in the vertical plane and a dynamic load which may be in a plane perpendicular thereto.

Superimposed on FIG. 1 there is a graphic presentation of the stress distribution, as will be seen in connection with plane "A" from FIG. 2, which is the surface plane of the rubber unit. Plane "B," which is the plane tangent to the tubular element, and Plane "C," which is the plane through the center of the tubular units, are also shown. In this diagrammatic presentation the stress is plotted on the vertical axis, representing the stress along a plane perpendicular to the outer wall of the unit, and the shear stress is along the XX axis, representing the magnitude of the shear stress for each of the three planes. Each of these curves is on a plane parallel to the surface of the unit, and the center curve is obtained by assuming a parabolic distribution of the stress forces. From the foregoing it will be seen that the maximum stress force is on the interior of the unit and the lower stress force is outwardly therefrom. By this means the more highly stressed rubber between the curved surfaces of the tubular supports is supported by the lower rubber stresses outwardly therefrom.

It will be seen in connection with FIG. 5 that the rubber on the line designated X will be the most highly stressed and outwardly therefrom will be of lower stress until at Z it will be still a lower stress. On the actual surface plane, not shown in FIG. 5, it would be of still lower magnitude.

FIGS. 3 and 4 clearly show the nature of the deformation under loaded conditions. The raised support 10 hunches its shoulder somewhat, and the unit pulls around the tubular support to the left at 11. On the lower portion, however, it bulges in a yielding abutment, and the line 25, which was formerly vertical, rotates around the unit as will be seen at 27 in FIG. 4. That is to say, a wall of elastomer surrounds the tubular elements on the outside and will be relatively unstressed and will provide for the more highly stressed elastomer section between the tubular supports. In this combination there is a resilient support unit so that increased flexibility may be obtained by using an extra long elastomer element between the supporting points, and stability is obtained by using a particular shape of supporting element, whereby some of the rubber elements are substantially reduced in length. This reduction in length of the elements increases the stress therein under a given load, but the design is such that there is also provided a substantial volume of less stressed rubber which protects them from premature failure. This unit produces a better bond between the steel and the elastomer and also a bond that has no particular weak spot between the elastomeric part and all of the steel parts.

Further, the bond produced by the vulcanization of the elastomer to the steel is reinforced mechanically by the shrinkage of the elastomer around the tube perimeter during this curing operation. This construction also gives a minimum of exposed perimeter at the junction of the tubular elements and the elastomeric material which is important inasmuch as all bond failures start at this point, and the less length the less possibility there is of failure.

It will be seen that any load along the axis of the tubular support will produce principally a shear displacement of the rubber and also cause some stresses in the elements between the tubular components, unless the outer members are free to move inwardly which is generally prevented by the relatively rigid mounting of the unit. These secondary stresses may be either compression or tension. The compression forces definitely add to the strength of the unit, particularly at the bond between the tubular steel parts and the elastomeric parts, and the secondary tension stresses resulting do not materially affect the durability of the unit.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claim.

I claim:

An elastomeric tubular support unit comprising two tubular supports, said tubular supports being parallel to one another and in a single plane, a solid block of elastomer between said tubular supports completely filling the volume between the tubular supports and in a uniform layer surrounding each of said tubular supports and the elastomer therebetween and being bonded thereto, said elastomeric unit having elastomer adaptable for shear displacement, said elastomeric block having a highly stressed central section between the rounded portions of the tubular supports and a lower stressed outer section between the tangents of the tubular supports, and a layer of rubber outwardly thereof bonded thereto of still lower stress when under loaded conditions.

References Cited in the file of this patent

UNITED STATES PATENTS

| | | |
|---|---|---|
| 2,257,804 | Lord | Oct. 7, 1941 |
| 2,440,670 | Kaemmerling | Apr. 27, 1948 |

OTHER REFERENCES

"The Use of Rubber in Vibration Isolation," June 25–27, 1937.